US012190214B2

(12) United States Patent
Jacobson et al.

(10) Patent No.: US 12,190,214 B2
(45) Date of Patent: *Jan. 7, 2025

(54) MACHINE LEARNING BASED ANALYSIS OF ELECTRONIC COMMUNICATIONS

(71) Applicant: Bank of America Corporation, Charlotte, NC (US)

(72) Inventors: Daniel M. Jacobson, Arlington County, VA (US); Belinda Franklin-Barr, Colorado Springs, CO (US); Patrick Lewis, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,999

(22) Filed: Oct. 5, 2023

(65) Prior Publication Data

US 2024/0028969 A1 Jan. 25, 2024

Related U.S. Application Data

(63) Continuation of application No. 16/991,886, filed on Aug. 12, 2020, now Pat. No. 11,847,537.

(51) Int. Cl.
*G06N 20/00* (2019.01)
*H04L 51/212* (2022.01)

(52) U.S. Cl.
CPC ........... *G06N 20/00* (2019.01); *H04L 51/212* (2022.05)

(58) Field of Classification Search
CPC .............................. G06N 20/00; H04L 51/212
See application file for complete search history.

(56) References Cited

U.S. PATENT DOCUMENTS

| | | | | |
|---|---|---|---|---|
| 6,023,723 A | * | 2/2000 | McCormick | G06Q 10/107 707/999.102 |
| 7,058,684 B1 | * | 6/2006 | Ueda | H04L 51/00 709/206 |
| 7,299,261 B1 | * | 11/2007 | Oliver | G06Q 10/107 709/204 |

(Continued)

*Primary Examiner* — David R Lazaro
(74) *Attorney, Agent, or Firm* — Banner & Witcoff, Ltd.

(57) ABSTRACT

Aspects of the disclosure relate to machine learning based analysis of electronic communications. A computing platform may monitor receipt of a potentially unacceptable electronic communication by a user. Then, the computing platform may extract one or more attributes of the potentially unacceptable electronic communication. The computing platform may then perform, based on the one or more attributes, textual analysis of the potentially unacceptable electronic communication. Subsequently, the computing platform may retrieve one or more rules applicable to the potentially unacceptable electronic communication. Then, the computing platform may determine, based on the textual analysis and the one or more rules, and based on a repository of previously identified unacceptable content, whether the potentially unacceptable electronic communication is unacceptable. Subsequently, the computing platform may trigger, based on a determination that the potentially unacceptable electronic communication is unacceptable, one or more actions associated with the unacceptable electronic communication.

20 Claims, 5 Drawing Sheets

(56) References Cited

U.S. PATENT DOCUMENTS

| | | | | |
|---|---|---|---|---|
| 7,636,716 B1* | 12/2009 | Cheng | | H04L 51/212 |
| | | | | 707/999.102 |
| 7,657,935 B2 | 2/2010 | Stolfo et al. | | |
| 7,822,977 B2* | 10/2010 | Katsikas | | H04L 63/0245 |
| | | | | 713/162 |
| 7,996,475 B2* | 8/2011 | Drako | | H04L 51/48 |
| | | | | 709/206 |
| 8,095,602 B1* | 1/2012 | Orbach | | G06Q 10/107 |
| | | | | 709/224 |
| 8,201,244 B2* | 6/2012 | Sun | | G06F 21/566 |
| | | | | 713/193 |
| 8,443,049 B1* | 5/2013 | Geddes | | H04L 63/126 |
| | | | | 709/208 |
| 8,495,144 B1* | 7/2013 | Cheng | | H04L 51/212 |
| | | | | 709/206 |
| 9,356,948 B2* | 5/2016 | Higbee | | H04L 63/1425 |
| 9,912,687 B1* | 3/2018 | Wescoe | | H04L 67/01 |
| 11,847,537 B2* | 12/2023 | Jacobson | | H04L 51/212 |
| 2003/0195937 A1* | 10/2003 | Kircher, Jr. | | H04L 9/40 |
| | | | | 709/207 |
| 2004/0167964 A1* | 8/2004 | Rounthwaite | | G06Q 10/107 |
| | | | | 709/206 |
| 2004/0167968 A1* | 8/2004 | Wilson | | G06F 16/9535 |
| | | | | 709/207 |
| 2005/0091321 A1* | 4/2005 | Daniell | | H04L 51/212 |
| | | | | 709/206 |
| 2006/0224750 A1* | 10/2006 | Davies | | H04L 69/08 |
| | | | | 709/229 |
| 2007/0107059 A1* | 5/2007 | Chasin | | H04L 63/1416 |
| | | | | 726/23 |
| 2007/0220043 A1* | 9/2007 | Oliver | | H04L 63/104 |
| 2007/0244974 A1* | 10/2007 | Chasin | | H04L 51/234 |
| | | | | 709/206 |
| 2008/0059590 A1* | 3/2008 | Sarafijanovic | | H04L 51/212 |
| | | | | 709/206 |
| 2009/0064323 A1* | 3/2009 | Lin | | H04L 51/212 |
| | | | | 726/22 |
| 2009/0157720 A1* | 6/2009 | Kolcz | | G06Q 10/10 |
| | | | | 707/999.102 |
| 2011/0258272 A1* | 10/2011 | Drako | | H04L 51/212 |
| | | | | 709/206 |
| 2012/0215862 A1* | 8/2012 | Cai | | H04L 47/824 |
| | | | | 709/206 |
| 2013/0018964 A1* | 1/2013 | Osipkov | | H04L 67/306 |
| | | | | 709/206 |
| 2013/0185230 A1* | 7/2013 | Zhu | | G06N 20/00 |
| | | | | 726/22 |
| 2016/0028763 A1* | 1/2016 | Cruz Mota | | H04L 63/1458 |
| | | | | 726/23 |
| 2016/0072749 A1* | 3/2016 | Lu | | H04L 51/42 |
| | | | | 709/206 |
| 2016/0180088 A1* | 6/2016 | Zhang | | H04L 63/1416 |
| | | | | 726/23 |
| 2018/0174170 A1* | 6/2018 | Lo Faro | | G06Q 10/067 |
| 2019/0020672 A1 | 1/2019 | Stolfo et al. | | |
| 2019/0132271 A1 | 5/2019 | Dargahi et al. | | |
| 2019/0132352 A1* | 5/2019 | Zhang | | H04L 63/1483 |
| 2019/0197107 A1 | 6/2019 | Lin et al. | | |
| 2019/0222606 A1 | 7/2019 | Schweighauser et al. | | |
| 2019/0238571 A1 | 8/2019 | Adir et al. | | |
| 2019/0260775 A1* | 8/2019 | Bartos | | G06F 21/564 |
| 2019/0349400 A1 | 11/2019 | Bruss et al. | | |
| 2019/0372926 A1 | 12/2019 | Elliott | | |
| 2020/0007502 A1* | 1/2020 | Everton | | H04L 51/063 |
| 2020/0067861 A1* | 2/2020 | Leddy | | G06F 21/6245 |
| 2020/0084219 A1 | 3/2020 | Sung et al. | | |
| 2020/0084228 A1 | 3/2020 | Goutal | | |
| 2020/0097912 A1 | 3/2020 | Favre et al. | | |
| 2020/0204572 A1* | 6/2020 | Jeyakumar | | G06F 21/561 |
| 2020/0280530 A1* | 9/2020 | Kessler | | H04L 47/50 |
| 2020/0344251 A1* | 10/2020 | Jeyakumar | | G06Q 10/107 |
| 2020/0374251 A1* | 11/2020 | Warshaw | | H04L 51/56 |
| 2020/0389486 A1* | 12/2020 | Jeyakumar | | H04L 63/20 |
| 2020/0396190 A1* | 12/2020 | Pickman | | H04L 67/306 |
| 2020/0396248 A1* | 12/2020 | Lee | | H04L 63/1425 |
| 2020/0396258 A1* | 12/2020 | Jeyakumar | | G06N 20/00 |
| 2021/0075828 A1* | 3/2021 | Kras | | H04L 51/42 |
| 2021/0168161 A1* | 6/2021 | Dunn | | H04L 63/1441 |
| 2021/0266345 A1* | 8/2021 | Chen | | H04L 63/1425 |
| 2021/0272066 A1* | 9/2021 | Bratman | | G06Q 10/0635 |
| 2021/0273976 A1* | 9/2021 | Reiser | | G06F 16/9035 |
| 2021/0281606 A1* | 9/2021 | Singh | | H04L 63/1483 |
| 2021/0286875 A1* | 9/2021 | Herman-Saffar | | G06N 20/00 |
| 2021/0336983 A1* | 10/2021 | Lee | | H04L 63/1483 |
| 2021/0406780 A1* | 12/2021 | Lesner | | G06F 18/285 |
| 2022/0021700 A1* | 1/2022 | Devlin | | G06N 20/00 |
| 2022/0051127 A1* | 2/2022 | Jacobson | | G06F 18/214 |
| 2024/0028969 A1* | 1/2024 | Jacobson | | H04L 51/212 |

\* cited by examiner

MACHINE LEARNING BASED ANALYSIS OF ELECTRONIC COMMUNICATIONS

CROSS REFERENCE TO RELATED APPLICATIONS

This application is a continuation of and claims priority to co-pending U.S. application Ser. No. 16/991,886, filed Aug. 12, 2020, and entitled, "Machine Learning Based Analysis of Electronic Communications," which is incorporated herein by reference in its entirety.

BACKGROUND

Aspects of the disclosure relate to deploying digital data processing systems to protect enterprise resources. In particular, one or more aspects of the disclosure relate to machine learning based analysis of electronic communications.

Enterprise organizations may utilize various computing infrastructure to identify cyber security threats, identify susceptibility of enterprise users to such threats, and undertake steps to prevent and/or mitigate the impact of cyber threat activities. For large enterprise organizations, maintaining, updating, and managing network activity over the various enterprise resources may be of significant importance in protecting confidential information and/or other sensitive data that is created, transmitted, and/or used for various purposes. It may be helpful to analyze potentially unacceptable electronic communications to detect patterns, anomalies and so forth, that may be indicative of an attempt to disrupt the network activity, and/or gain unauthorized access to enterprise resources. As data flows through the network in real-time, such detection and management of network activity may be time-sensitive and might need to be performed in real-time as well. Ensuring that anticipated cyber security threats are identified, and timely and targeted remediation measures are taken to bolster cyber defense and minimize an impact to enterprise services, may be highly advantageous to prevention of cyber security threats. In many instances, however, it may be difficult to identify cyber security threats, and undertake steps to prevent and/or mitigate the impact of cyber threat activities with speed and accuracy while also attempting to optimize network resources, bandwidth utilization, and efficient operations of the computing infrastructure involved in performing such cyber defense activities.

SUMMARY

Aspects of the disclosure provide effective, efficient, scalable, fast, reliable, and convenient technical solutions that address and overcome the technical problems associated with analysis of potentially unacceptable electronic communications.

In accordance with one or more embodiments, a computing platform having at least one processor, a communication interface, and memory may monitor, via a computing device, receipt of a potentially unacceptable electronic communication by a user. Then, the computing platform may extract, via the computing device, one or more attributes of the potentially unacceptable electronic communication. The computing platform may then perform, via the computing device and based on the one or more attributes, textual analysis of the potentially unacceptable electronic communication. Subsequently, the computing platform may retrieve one or more rules applicable to the potentially unacceptable electronic communication. Then, the computing platform may determine, based on the textual analysis and the one or more rules, and based on a repository of previously identified unacceptable content, whether the potentially unacceptable electronic communication is unacceptable. Subsequently, the computing platform may trigger, based on a determination that the potentially unacceptable electronic communication is unacceptable, one or more actions associated with the unacceptable electronic communication.

In some embodiments, the computing platform may train a machine learning model to determine whether the potentially unacceptable electronic communication is unacceptable. In some embodiments, the machine learning model may include a first logistic regression model to determine whether the potentially unacceptable electronic communication is authorized, a second logistic regression model to determine whether the potentially unacceptable electronic communication is spam, a third logistic regression model to determine whether the potentially unacceptable electronic communication is a test communication, and a fourth logistic regression model to determine whether the potentially unacceptable electronic communication is malicious. In some embodiments, the machine learning model may include, for each logistic regression model, a cost function, and the computing platform may optimize the cost function. In some embodiments, the computing platform may dynamically adjust, for each logistic regression model, a threshold associated with the cost function. In some embodiments, the computing platform may aggregate an output of, the first regression model, the second logistic regression model, the third logistic regression model, and the fourth logistic regression model, to determine whether the potentially unacceptable electronic communication is unacceptable. In some embodiments, the computing platform may generate, based on an output of one or more regression models, labeled data to train the machine learning model.

In some embodiments, the computing platform may retrieve, from an electronic mailbox of the user, the potentially unacceptable electronic communication received by the user. Then, the computing platform may extract the one or more attributes based on the retrieved electronic communication.

In some embodiments, the computing platform may perform the textual analysis based on natural language processing.

In some embodiments, the one or more attributes may include a subject, a header, a sender, a recipient, a body, a mail server, and a message identifier.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
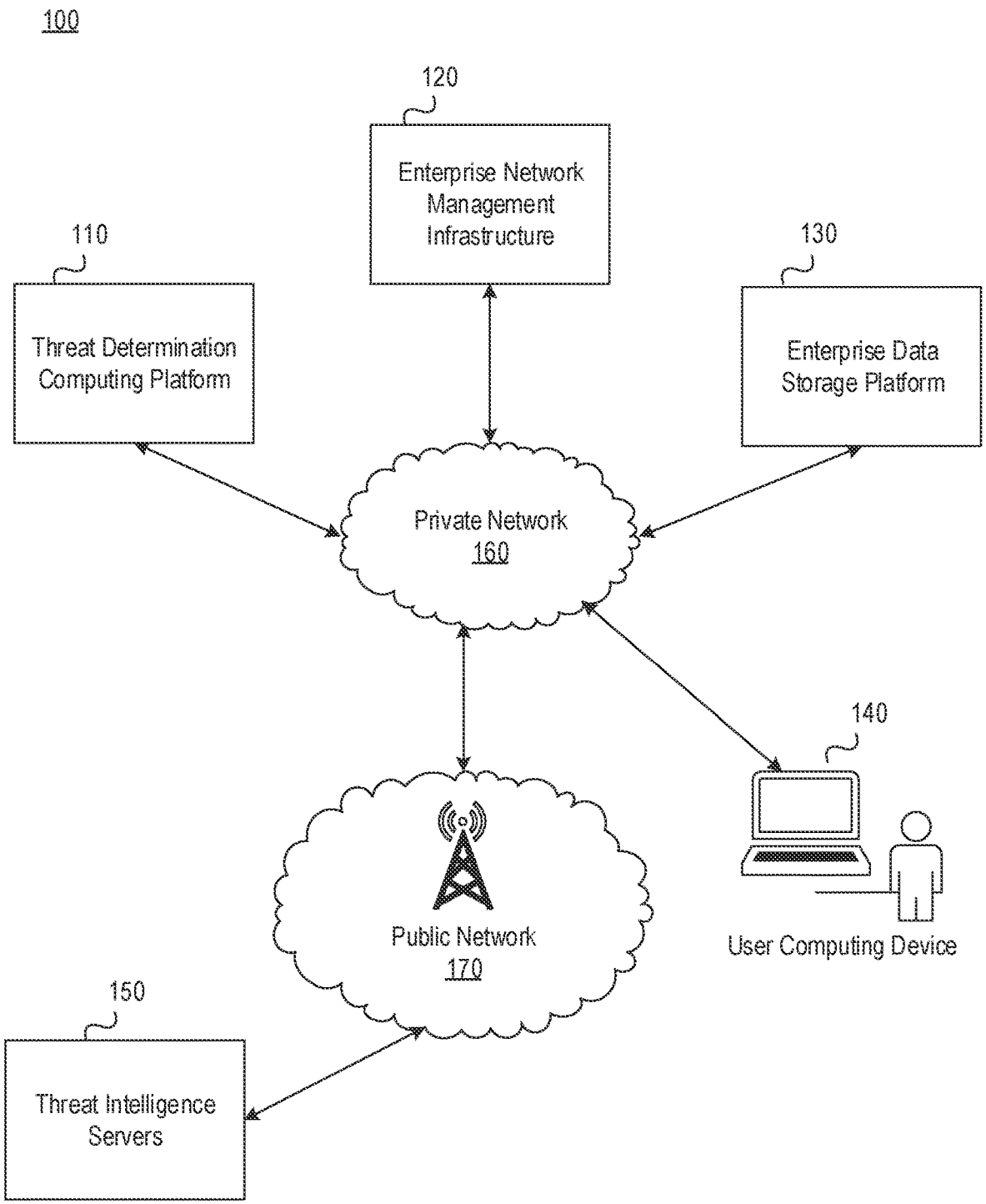
FIGS. 1A and 1B depict an illustrative computing environment for machine learning based analysis of electronic communications in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to machine learning based analysis of electronic communications. Enterprise organizations may be vulnerable to a variety internal and external cyber security threats. For example, there may be threats from malicious campaigns targeting an enterprise and/or a wider industry sector, direct threats to an enterprise organization or a geographic region, and so forth. Also, for example, an enterprise organization, such as a financial institution, may be vulnerable to malicious campaigns targeting customer assets and/or confidential information. A large amount of data may be received via electronic communications. In some instances, such data, unless adequately monitored, may pose a large security threat to the enterprise services. For large enterprise organizations with vast amounts of deployed resources and a large number of employees, potential malicious campaigns may take varied and complex forms, and may require real-time monitoring. Accordingly, identifying and responding to such threats while also attempting to optimize network resources, bandwidth utilization, and efficient operations of the computing infrastructure involved in performing such cyber threat related activities may pose a significant challenge to enterprise organizations. Accordingly, adopting robust cyber defense measures may be significantly advantageous to a running of a successful enterprise.

Accordingly, aspects of this disclosure relate to machine learning based analysis of electronic communications to identify potentially harmful communications, and initiate actions to prevent and/or mitigate consequences of such harmful communications. Identifying potentially unacceptable electronic communications via a manual process and/or based on mental steps is unlikely because it relates to vast amounts of real-time network data traffic, and such network data traffic is rapidly changing in real-time over thousands of enterprise resources. In some aspects, a manual detection of unacceptable content in electronic communications may not be possible, and may cause an enterprise organization to be vulnerable to cyber security incidents. Also, since the network data may reside and/or be exchanged over a vast array of users and network devices, it necessitates a use of computing devices to access the data over networks, detect patterns and/or anomalous behaviors in real-time as the electronic communications are received, and initiate relevant action in real-time and over the network. It may be noted, that as data transmissions occur over a computing network, the problem of detecting potentially unacceptable electronic communications across an enterprise infrastructure arises in the realm of networks, and as described herein, a solution is necessarily rooted in computer technology to overcome a problem arising in the realm of computer networks.

Figure 1B:
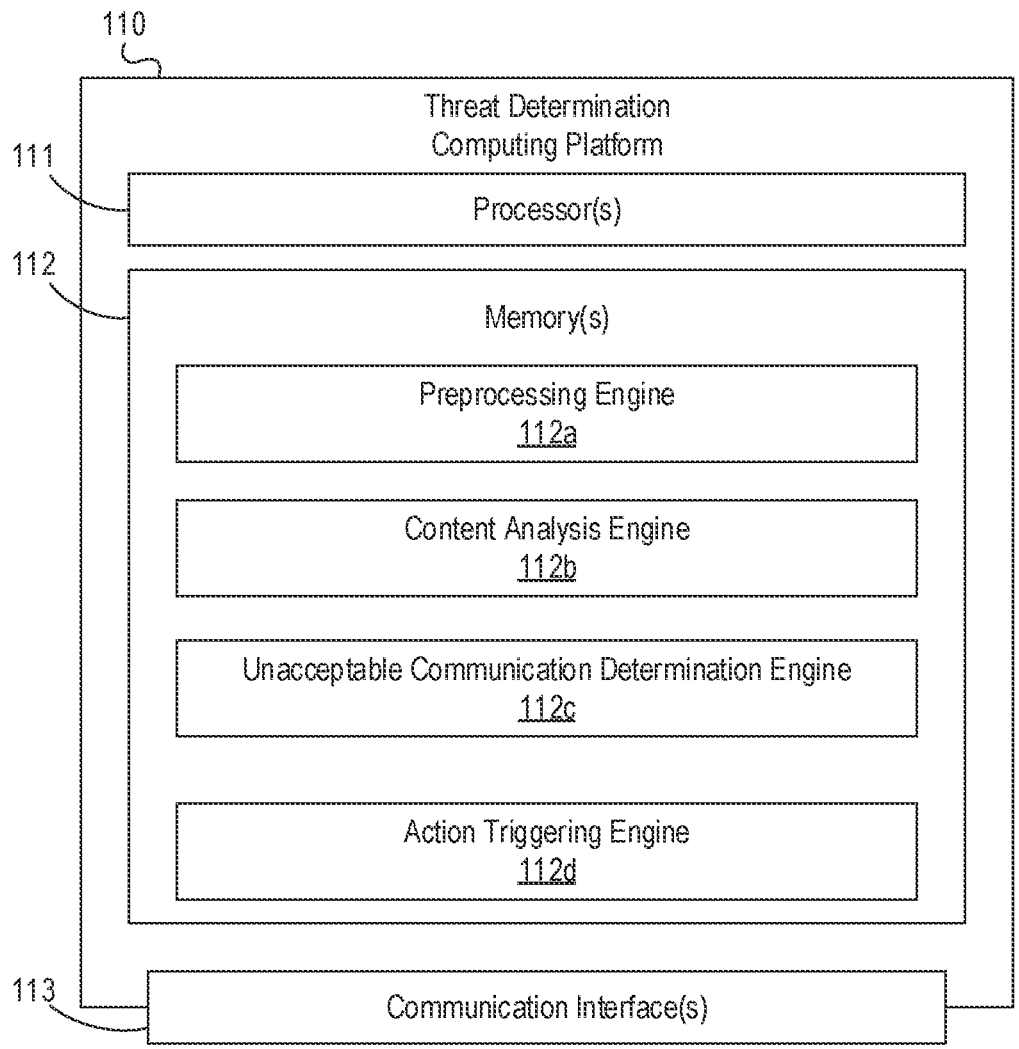

FIGS. 1A and 1B depict an illustrative computing environment for machine learning based analysis of electronic communications in accordance with one or more example embodiments. Referring to FIG. 1A, computing environment 100 may include one or more computer systems. For example, computing environment 100 may include threat determination computing platform 110, enterprise network management infrastructure 120, enterprise data storage platform 130, user computing device 140, and threat intelligence servers 150.

As illustrated in greater detail below, threat determination computing platform 110 may include one or more computing devices configured to perform one or more of the functions described herein. For example, threat determination computing platform 110 may include one or more computers (e.g., laptop computers, desktop computers, servers, server blades, or the like) and/or other computer components (e.g., processors, memories, communication interfaces).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications. For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, and/or other information. Also, for example, enterprise network management infrastructure 120 may include various servers and/or databases that may manage information technology resources for the enterprise organization, such as, for example, electronic mail servers. Additionally, or alternatively, enterprise network management infrastructure 120 may receive instructions from threat determination computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including data related to network devices and/or other resources hosted, executed, and/or otherwise provided by enterprise network management infrastructure 120. Also, for example, enterprise data storage platform 130 may be configured to store and/or otherwise maintain enterprise data related to electronic communications, malicious campaigns, cybersecurity threats, and so forth. Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

User computing device 140 may be a personal computing device (e.g., desktop computer, laptop computer) or mobile computing device (e.g., smartphone, tablet, wearable device). In addition, user computing device 140 may be linked to and/or used by a specific enterprise user (who may, e.g., be an employee or other affiliate of an enterprise organization operating threat determination computing platform 110). For example, user may send and/or receive electronic communications via user computing device 140. Threat intelligence servers 150 may be an intended recipient of a transmission of textual data from user computing device 140.

Threat intelligence servers 150 may include one or more computing devices and/or other computer components (e.g., processors, memories, communication interfaces) that may provide intelligence on cybersecurity threats. In some embodiments, threat intelligence servers 150 may include one or more platforms that may detect potentially unacceptable activity in network resources (e.g., enterprise network management infrastructure 120). For example, threat intelligence servers 150 may include one or more software-as-a-service (SaaS) platforms, on-premise software products, and so forth, to identify potentially unacceptable activity. In some embodiments, threat intelligence servers 150 may be included within enterprise network management infrastructure 120, and/or may include internal servers within enterprise network management infrastructure 120 that may interact with external servers.

Computing environment 100 also may include one or more networks, which may interconnect one or more of threat determination computing platform 110, enterprise network management infrastructure 120, enterprise data storage platform 130, user computing device 140, and threat intelligence servers 150. For example, computing environment 100 may include private network 160 (which may interconnect, for example, threat determination computing platform 110, enterprise network management infrastructure 120, and enterprise data storage platform 130, user computing device 140, and/or one or more other systems (which may be associated with an organization, such as a financial institution), and public network 170 (which may interconnect, for example, threat intelligence servers 150 with private network 160 and/or one or more other systems, public networks, sub-networks, and/or the like). For example, public network 170 may interconnect threat intelligence servers 150 with user computing device 140 via private network 160. In some instances, public network 170 may be a high generation cellular network, such as, for example, a fifth generation ("5G") or higher cellular network. In some instances, private network 160 may likewise be a high generation cellular enterprise network, such as, for example, a 5G or higher cellular network.

In one or more arrangements, threat determination computing platform 110, enterprise network management infrastructure 120, enterprise data storage platform 130, user computing device 140, and threat intelligence servers 150, and/or the other systems included in computing environment 100 may be any type of computing device capable of communicating with a user interface, receiving input via the user interface, and communicating the received input to one or more other computing devices. For example, threat determination computing platform 110, enterprise network management infrastructure 120, enterprise data storage platform 130, user computing device 140, and threat intelligence servers 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of threat determination computing platform 110, enterprise network management infrastructure 120, enterprise data storage platform 130, user computing device 140, and threat intelligence servers 150, may, in some instances, be special-purpose computing devices configured to perform specific functions.

Referring to FIG. 1B, threat determination computing platform 110 may include one or more processors 111, memory 112, and communication interface 113. A data bus may interconnect processor 111, memory 112, and communication interface 113. Communication interface 113 may be a network interface configured to support communication between threat determination computing platform 110 and one or more networks (e.g., public network, private network, a local network, or the like). Memory 112 may include one or more program modules having instructions that when executed by processor 111 cause threat determination computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of threat determination computing platform 110 and/or by different computing devices that may form and/or otherwise make up threat determination computing platform 110.

For example, memory 112 may have, store, and/or include preprocessing engine 112a, content analysis engine 112b, unacceptable communication determination engine 112c, and action triggering engine 112d. Preprocessing engine 112a may have instructions that direct and/or cause threat determination computing platform 110 to monitor, via a computing device, receipt of a potentially unacceptable electronic communication by a user. In some embodiments, preprocessing engine 112a may have instructions that direct and/or cause threat determination computing platform 110 to extract, via the computing device, one or more attributes of the potentially unacceptable electronic communication.

Content analysis engine 112b may have instructions that direct and/or cause threat determination computing platform 110 to perform, via the computing device and based on the one or more attributes, textual analysis of the potentially unacceptable electronic communication. Content analysis engine 112b may also have instructions that direct and/or cause threat determination computing platform 110 to retrieve one or more rules applicable to the potentially unacceptable electronic communication.

Unacceptable communication determination engine 112c may have instructions that direct and/or cause threat determination computing platform 110 to determine, based on the textual analysis and the one or more rules and based on a repository of previously identified unacceptable content, whether the potentially unacceptable electronic communication is unacceptable. In some embodiments, unacceptable communication determination engine 112c may have instructions that direct and/or cause threat determination computing platform 110 to train a machine learning model to determine whether the potentially unacceptable electronic communication is unacceptable.

Action triggering engine 112d may have instructions that direct and/or cause threat determination computing platform 110 to trigger, based on a determination that the potentially unacceptable electronic communication is unacceptable, one or more actions associated with the unacceptable electronic communication.

Figure 2:
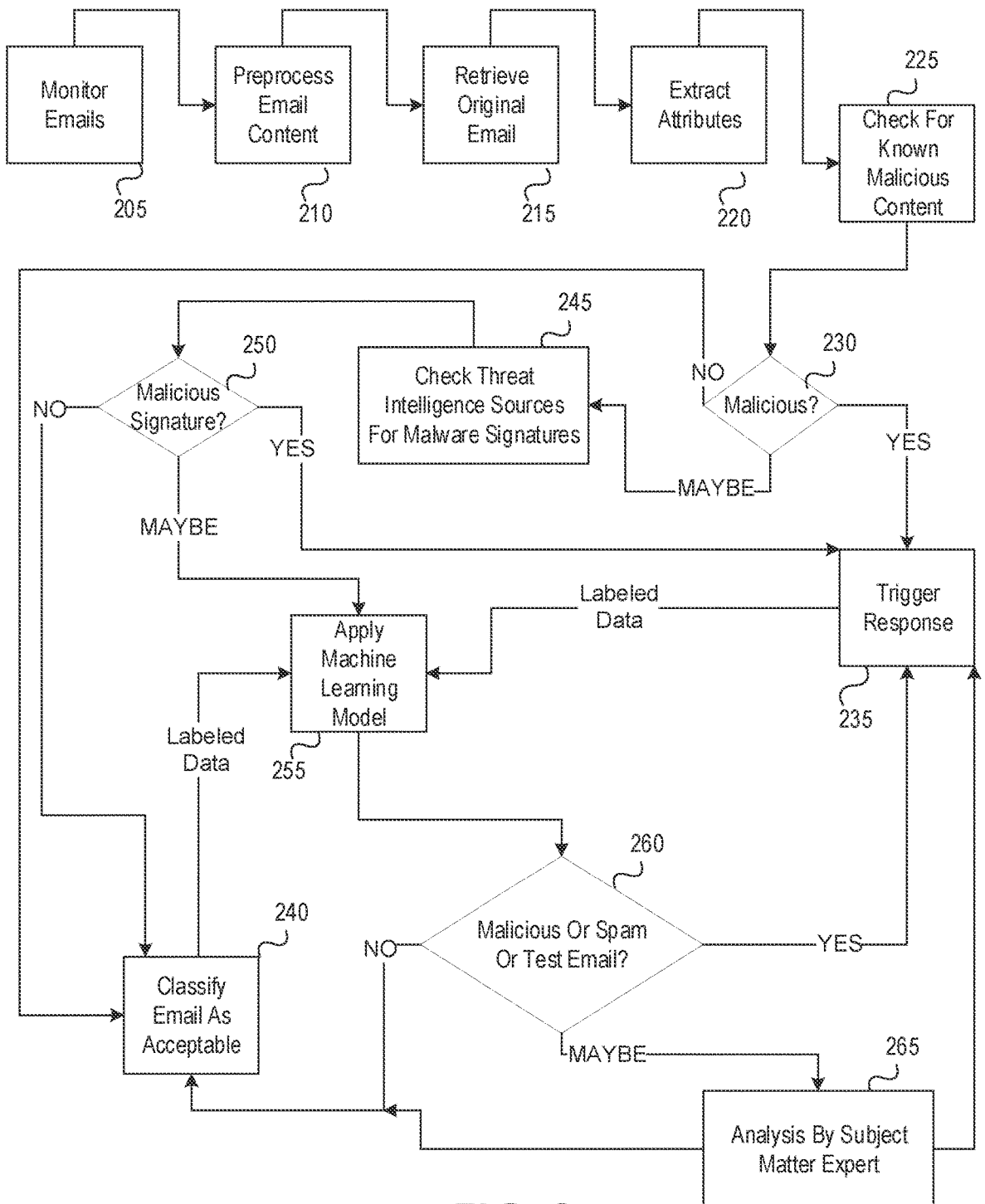
FIG. 2 depicts an illustrative method for machine learning based analysis of electronic communications in accordance with one or more example embodiments.

FIG. 2 depicts an illustrative method for machine learning based analysis of electronic communications in accordance with one or more example embodiments. Referring to FIG. 2, at step 205, threat determination computing platform 110 may monitor, via a computing device, receipt of a potentially unacceptable electronic communication by a user. For example, enterprise users may receive electronic communications via an electronic mailbox. Such communications may be from internal sources within an enterprise computing infrastructure managed by an enterprise network management infrastructure (e.g., enterprise network management infrastructure 120). Accordingly, threat determination computing platform 110 may monitor such incoming electronic communications at electronic mailboxes. In some instances, a user may receive a potentially unacceptable electronic communication, and may forward the electronic communication to threat determination computing platform 110. Also, for example, the user may receive the communication in an electronic inbox, and may cause the communication to be moved to a folder marked "spam" or "junk," and threat determination computing platform 110 may monitor the user's electronic mail folder marked "spam" or "junk." Generally, an unacceptable electronic communication may be any communication that may be deemed to be harmful for an enterprise organization. In some instances, a communication may have been authorized by the enterprise organization but may still be categorized as harmful with respect to a particular user (for instance a test communication or an accidental mass mailing). Accordingly, in some instances, an authorized communication may be categorized as unacceptable.

At step 210, threat determination computing platform 110 may preprocess the electronic communication or email content. For example, threat determination computing platform 110 may convert any unstructured data into structured form. In some embodiments, threat determination computing platform 110 may isolate attachments, and preprocess them for potential malware. Also, for example, in some embodiments, threat determination computing platform 110 may distribute aspects of the email content into various categories.

In some embodiments, threat determination computing platform 110 may scan, via the computing device, a content of the electronic communication. For example, threat determination computing platform 110 may access the electronic communication and scan its contents. As used herein, the content of the electronic communication may include data such as a header, metadata, and so forth. For example, the content of the electronic communication may include, for example, a body, a header, a subject, an attachment, and so forth. Threat determination computing platform 110 may utilize one or more techniques to scan the content of the electronic communication. For example, threat determination computing platform 110 may perform optical character recognition ("OCR") to scan the content of the electronic communication. In some embodiments, a neural network-based methodology may be utilized to recognize attachments (e.g., for hand-written documents attached to electronic communications).

At step 215, in some embodiments, threat determination computing platform 110 may retrieve, from an electronic mailbox of the user, the potentially unacceptable electronic communication received by the user. In some embodiments, a forwarded communication may lose headers, attachments, original content, list of recipients, and so forth. Accordingly, threat determination computing platform 110 may retrieve the potentially unacceptable electronic communication received by the user from the user's electronic mailbox. Accordingly, threat determination computing platform 110 may have access to the electronic communication with its data as received by the user.

At step 220, in some embodiments, threat determination computing platform 110 may extract, via the computing device, one or more attributes of the potentially unacceptable electronic communication. In some embodiments, the one or more attributes may include a subject, a header, a sender, a recipient, a body, a mail server, and a message identifier. Also, for example, the one or more attributes may include a list of computer network nodes that may have routed the electronic communication. As another example, the one or more attributes may include network information associated with transmission of the electronic communication, including a host server, intermediate mail servers, dates and/or times for routing information, intended recipients, and so forth.

In some embodiments, threat determination computing platform 110 may perform, via the computing device and based on the one or more attributes, textual analysis of the potentially unacceptable electronic communication. A textual analysis of the content may be performed, for example, based on natural language processing, part-of-speech tagging, parsing, maximum entropy language models, neural networks, and so forth. In some embodiments, threat determination computing platform 110 may perform the textual analysis based on a language model. Generally, a language model may be a probability distribution over a collection of words. In some instances, the language model may depend on a set of words that appeared previously (e.g., unigram models, n-gram models, bidirectional models, and so forth). In some embodiments, a language model may differentiate between two collections of words that may sound similar but have different meanings. For example, the collections of words, "lets meet for wine" and "lets meet at nine" sound similar, but have different meanings.

In some embodiments, n-grams, and term frequency-inverse domain frequency (TF-IDF) may be utilized to perform sentiment analysis of the electronic communication. For example, threat determination computing platform 110 may determine an intent of the electronic communication, such as, for example, whether a recipient may be required to forward the electronic communication, follow a link embedded in the electronic communication, open a file attached to the electronic communication, respond to the electronic communication, and so forth.

At step 225, in some embodiments, threat determination computing platform 110 may analyze the electronic communication to detect previously detected malicious content. For example, the content of the electronic communication may be substantially similar to a previously received electronic communication that was determined to be unacceptable. Also, for example, the one or more attributes, such as a header, message identifier, host, sender, IP address, and so forth may be in a list of attributes previously detected and classified as unacceptable.

At step 230, threat determination computing platform 110 may determine whether the electronic communication is malicious. For example, threat determination computing platform 110 may determine, based on the textual analysis and the one or more rules, and based on a repository of previously identified unacceptable content, whether the potentially unacceptable electronic communication is unacceptable. For example, a URL, a message header, an attached file, a body of a message, a link in the message, and so forth, may be detected, and identified as malicious.

In some embodiments, threat determination computing platform 110 may generate descriptions of malware families based on patterns, for example, patterns detected in electronic communications. In some embodiments, threat determination computing platform 110 may generate a string based on the one or more attributes, and detect patterns based on the strings. For example, the string may include a subject, sender email addresses, and a body of the message. For example, one or more rules may be based on the generated string. For example, the one or more rules may include classifying the electronic communication based on the string. Also, for example, the one or more rules may be based on wild cards, regular expressions, case-sensitive strings, case-insensitive strings, and so forth. In some examples, the one or more rules may be based on whether the one or more attributes correspond to previously detected malicious content.

Upon a determination that the electronic communication is malicious, threat determination computing platform 110 may trigger, at step 235, one or more actions associated with the unacceptable electronic communication. For example, threat determination computing platform 110 may send the electronic communication to security personnel for further action. In some example, threat determination computing platform 110 may send an electronic mail to the user receiving the electronic message, informing the user that they were a target of an unacceptable communication, and/or direct the user to one or more training resources to be better educated to manage future unacceptable communications. In some embodiments, threat determination computing platform 110 may prevent further transmission of the electronic communication. For example, the electronic communication may be quarantined in a separate mail box. Upon review and analysis as described herein, if threat determination computing platform 110 identifies the electronic communication to be unacceptable, then the electronic communication may be removed from the user's mailbox, and prevented from being transmitted further.

In some embodiments, threat determination computing platform 110 may modify access permission of the user to access enterprise infrastructures (e.g., enterprise network management infrastructure 120). For example, threat determination computing platform 110 may cause the user to change login credentials more frequently. As another example, threat determination computing platform 110 may disable the user's ability to open attachments in the electronic messages. Also, for example, threat determination computing platform 110 may remove attachments from the electronic messages directed at the user. As another example, threat determination computing platform 110 may disable the user's ability to open links in the electronic messages. As another example, threat determination computing platform 110 may disable the user's ability to visit certain web resources. Additional, and/or alternate security measures may be implemented. For example, threat determination computing platform 110 may modify access permissions of the user to certain enterprise resources and/or enterprise applications. Such security measures may enable an enterprise organization to increase a security system (e.g., a firewall), and/or minimize vulnerabilities associated with security loopholes. In some embodiments, threat determination computing platform 110 may send instructions to various entities within the enterprise infrastructures (e.g., enterprise network management infrastructure 120) to execute a modification of access permissions. In some embodiments, threat determination computing platform 110 may store the access permissions in an enterprise database (e.g., enterprise data storage platform 130).

Upon a determination that the electronic communication is not malicious, threat determination computing platform 110 may, at step 240, classify the electronic communication as acceptable. Generally, for purposes herein, any communication that is not determined to be malicious, spam, or unacceptable, may be classified as an acceptable communication. For example, threat determination computing platform 110 may, upon a determination that a communication is not malicious, spam, or unacceptable, label the electronic communication as an acceptable communication. In some embodiments, threat determination computing platform 110 may add such information to the machine learning model as labeled data. In some embodiments, the one or more attributes associated with the electronic communication may be labeled as "safe" or "authorized" or "legitimate" and stored in enterprise data storage platform 130.

In some embodiments, threat determination computing platform 110 may be unable to determine whether the electronic communication is malicious. Accordingly, at step 245, threat determination computing platform 110 may utilize threat intelligence sources to look for malicious signatures. Generally, a signature may be a sequence of bytes that may be commonly detected in malware. In some embodiments, the malicious signature may be a unique value (e.g., a hash value) indicative of malware. In some embodiments, threat determination computing platform 110 may retrieve such signatures from threat intelligence servers 150.

In some embodiments, threat determination computing platform 110 may receive cyber threat intelligence, such a signatures associated with malware, from one or more sources (e.g., threat intelligence servers 150). In some embodiments, threat determination computing platform 110 may receive strategic threat intelligence that may encompass conceptual abstracts of intelligence data, and/or analyses of enterprise activities, to identify sources and/or types of cyber threats. In some embodiments, threat determination computing platform 110 may receive tactical threat intelligence that may encompass appropriate enterprise network activity information. For example, threat determination computing platform 110 may receive cyber threat intelligence related to network intrusions in companies in a similar industry sector, and may adopt preventive measures to respond to such potential network intrusions targeting the enterprise infrastructures (e.g., enterprise network management infrastructure 120).

In some embodiments, threat determination computing platform 110 may analyze strategic threat intelligence and determine cyber defense strategies that may facilitate effective responses by a target enterprise organization to mitigate the cyber threat. Also, for example, threat determination computing platform 110 may analyze tactical threat to identify threats and may cause an adoption of appropriate response strategies. For example, threat determination computing platform 110 may receive tactical threat intelligence related to network intrusions in companies in a similar industry sector, and threat determination computing platform 110 may cause an adoption of preventive measures to respond to such potential network intrusions targeting the enterprise infrastructures (e.g., enterprise network management infrastructure 120).

In some embodiments, threat determination computing platform 110 may apply, based on the analyzing, predictive analysis to identify anticipated cyber threat activity, malicious communications, malicious signatures, and so forth. Predictive analysis generally encompasses an array of statistical analyses techniques that include predictive models, machine learning models, data mining models, and so forth that may be utilized to make predictions about future cyber threat activities based on current and/or historical cyber threat activities. For example, threat determination computing platform 110 may gather data from cyber threat intelligence from one or more sources (e.g., threat intelligence servers 150), retrieve historical data from an enterprise database (e.g., enterprise data storage platform 130), and apply statistical analyses to such data to validate the assumptions, hypothesis and test them using standard statistical models. Predictive modeling may be used for example, to identify a type of cyber threat activity (e.g., phishing, vishing, and so forth), a source of the cyber threat activity (e.g., domestic, foreign, competitor), a timing of the cyber threat activity (e.g., tax related phishing campaigns during tax season), potential vulnerabilities with an enterprise information technology resource network, and so forth. Also, for example, threat determination computing platform 110 may cause one or more security measures to be proactively applied prior to an actual cyber threat activity. For example, machine learning models may indicate a higher likelihood of a phishing activity via electronic mails, and threat determination computing platform 110 may cause additional filters to be applied to incoming electronic mails.

At step 250, threat determination computing platform 110 may determine whether the electronic communication includes a malicious signature. Upon a determination that the electronic communication includes a malicious signature, threat determination computing platform 110 may proceed to step 235. Upon a determination that the electronic communication does not include a malicious signature, threat determination computing platform 110 may proceed to step 240.

In some embodiments, threat determination computing platform 110 may be unable to determine whether the electronic communication includes a malicious signature. Accordingly, at step 255, threat determination computing platform 110 may apply a machine learning model to determine whether the electronic communication is malicious.

In some embodiments, threat determination computing platform 110 may train a machine learning model to determine whether the potentially unacceptable electronic communication is unacceptable. For example, the machine learning model may be trained to detect if an electronic communication is spam, malicious, a test communication, or acceptable. A malicious email may generally refer to an electronic communication that is sent with an intent to cause damage to network resources, and/or users of a network resource. For example, a malicious email may cause a recipient to click on a link in the email, and direct the user to an unacceptable and/or unwanted web resource. Also, for example, a malicious email may cause a recipient to open an attachment, and may cause an instruction of malware that may corrupt files, folders, applications, and/or other network resources. For example, a hostile actor may send electronic mail communications to thousands of recipients, and the electronic mail may require the recipient to perform one or more activities. For example, the electronic mail may include an attachment and the recipient may be expected to open the attachment. In some instances, when an enterprise application is utilized to open an application, an unauthorized software (e.g., a virus) may be introduced into that application, thereby making the enterprise computing infrastructure (e.g., enterprise network management infrastructure 120) vulnerable to additional threats.

Also, for example, the electronic communication may include a link and the recipient may be expected to click the link to follow it to an unauthorized web resource. In some instances, when an enterprise application is utilized to open a link, an unauthorized software (e.g., a virus) may be introduced into that application, thereby making the enterprise computing infrastructure (e.g., enterprise network management infrastructure 120) vulnerable to additional threats. Also, for example, a recipient may be directed to a web resource that emulates an enterprise login page, and an unsuspecting recipient may be caused to reveal login credentials to the enterprise computing infrastructure (e.g., enterprise network management infrastructure 120). Accordingly, a hostile actor may gain entry to the enterprise computing infrastructure (e.g., enterprise network management infrastructure 120). As another example, the electronic mail may require the recipient to respond to the electronic mail, thereby verifying an email address, internet protocol ("IP") address, and so forth.

In some instances, the electronic communication may be a test communication that emulates a cyber threat activity. For example, a network manager of enterprise network computing infrastructure 120 may configure an electronic mail, a telephone call, a text message, and so forth, to emulate a known cyber threat.

A spam email may generally describe an unwanted, and/or unacceptable electronic message that may be sent in bulk to a large number of recipients. Such spam emails may cause harm to a network, and may use and/or suspend network activity, thereby causing harm to a network. In some embodiments, the potential cyber threat activity may include one or more of a phishing activity, a smishing activity, a spear phishing activity, a vishing activity, a cloned phishing activity, and a whaling activity. Generally, a traditional phishing activity may be propagated in a form of electronic mails sent to multiple recipients (e.g., mass mailings). By increasing a number of recipients, a hostile actor sending the mass mails may increase a chance of one or more recipients being susceptible to the phishing activity.

In some instances, the potential cyber threat activity may be a cloned phishing activity. A cloned phishing activity may be a version of a phishing activity. In such instances, a recipient may have received an acceptable electronic communication that was previously delivered. Such an electronic communication may have previously included an attachment and/or link. A hostile actor may have acquired access to the acceptable electronic communication, and may alter the content (e.g., an attachment and/or link) to emulate the original acceptable electronic communication. A recipient who has previously received such an acceptable electronic communication may not suspect that the communication may have been altered, and may open the attachment or click on the link again.

In some instances, the potential cyber threat activity may be a whaling activity. A whaling activity may be a version of a phishing activity. In such instances, recipients are generally high-profile executives of an enterprise organization. For example, a whaling activity may target C-suite executives of an enterprise organization. Such executives may be asked to provide time-sensitive responses to electronic communications by providing sensitive information, signing documents, opening attachments to electronic mails, and so forth.

In some instances, the potential cyber threat activity may be a spear phishing activity. A spear phishing activity may be a targeted form of a phishing activity or smishing activity, where recipients may be targeted based on one or more characteristics. For example, recipients may be targeted based on an affiliation to a specific enterprise organizations. For example, customers who visit a local pharmacy may be a target of a spear phishing activity. A hostile actor may, for example, emulate a payment website of the pharmacy, and induce customers to visit such a website to pay for their prescription medications. Also, for example, enterprise customers of financial institutions (e.g., a bank) may be a target of a spear phishing activity. A hostile actor may, for example, emulate a login website of the bank, and induce customers to visit such a website to enter login credentials.

Figure 3:
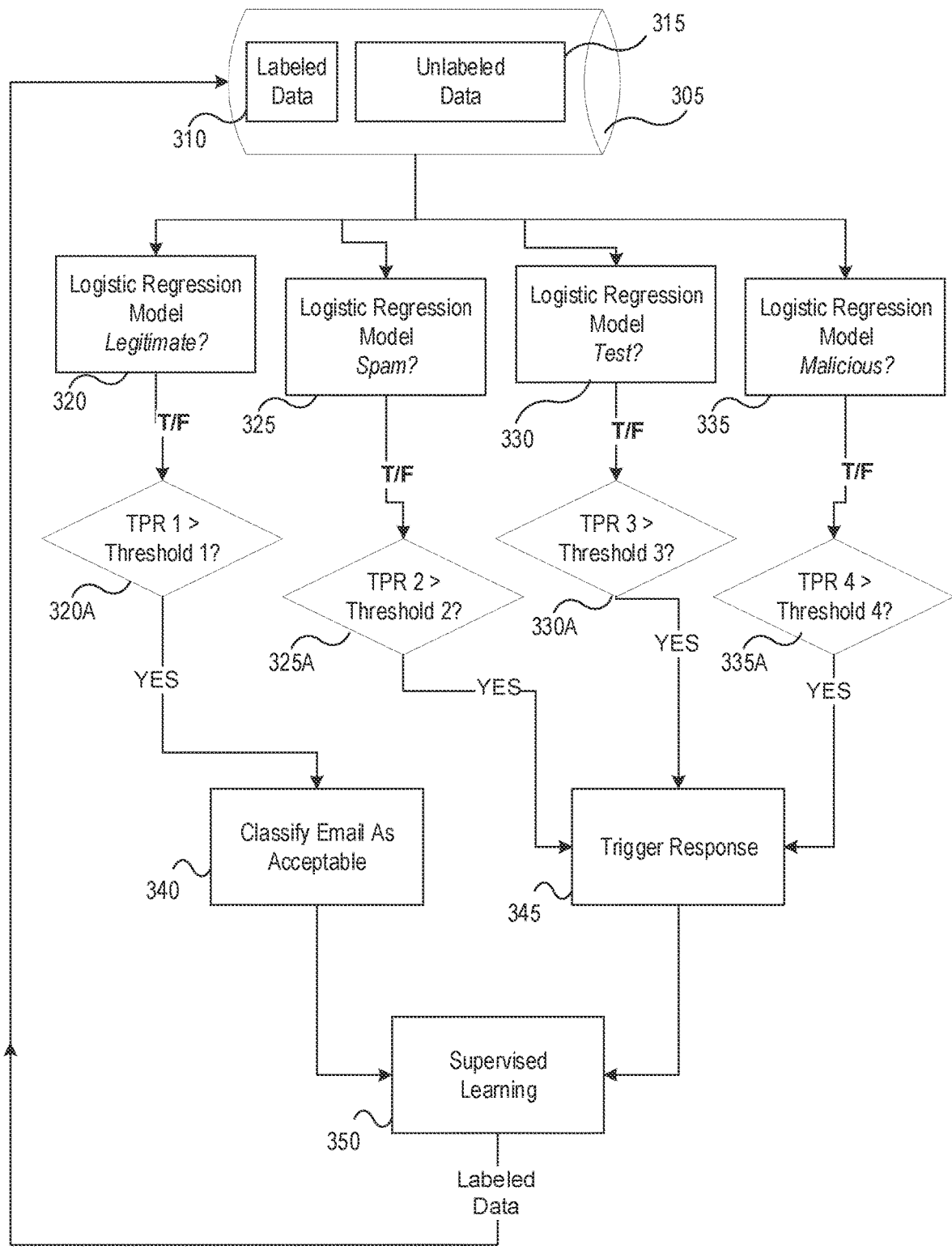
FIG. 3 depicts an illustrative method for a machine learning model in accordance with one or more example embodiments.

FIG. 3 depicts an illustrative method for a machine learning model in accordance with one or more example embodiments. Referring to FIG. 3, in some embodiments, the machine learning model may receive data comprising electronic communications from a repository 305. In some embodiments, the received data may include labeled data 310 and unlabeled data 315, and the machine learning model may perform supervised learning. For example, the machine learning model may learn a function based on labeled data 310, and apply the function to classify unlabeled data 315.

In some embodiments, the machine learning model may include one or more independent logistic regression models. For example, the machine learning model may include a first logistic regression model 320 to determine whether the potentially unacceptable electronic communication is authorized, a second logistic regression model 325 to determine whether the potentially unacceptable electronic communication is spam, a third logistic regression model 330 to determine whether the potentially unacceptable electronic communication is a test communication, and a fourth logistic regression model 335 to determine whether the potentially unacceptable electronic communication is malicious.

In some embodiments, the machine learning model may include, for each logistic regression model, a cost function, and threat determination computing platform 110 may optimize the cost function. For example, the cost function may be based on a true positive rate, a false positive rate, a true negative rate, and/or a true positive rate. In some embodiments, the cost function may be a log-loss cost function. In some embodiments, the cost function may be optimized, based, on, for example, a method of gradient descent.

In some embodiments, threat determination computing platform 110 may dynamically adjust, for each logistic regression model, a threshold associated with the cost function. For example, threat determination computing platform 110 may dynamically adjust a first threshold associated with the first logistic regression model, a second threshold associated with the second logistic regression model, a third threshold associated with the third logistic regression model, and a fourth threshold associated with the fourth logistic regression model.

For example, threat determination computing platform 110 may determine the first threshold for true positive rates (TPR) to be 90%. Accordingly, the first logistic regression model may be trained to have a TPR at or above 90%. Generally, a high threshold may be set to ensure that the electronic communication is determined to be acceptable with a high degree of certainty. In some embodiments, the machine learning model may determine, at step 320A, whether a first true positive rate (TPR1) associated with the first logistic regression model exceeds the first threshold. Upon a determination that TPR1 exceeds the first threshold, the machine learning model may, at step 340, classify the electronic communication as highly likely to be an acceptable communication. For example, when the electronic communication is input into the first logistic regression model, and the first logistic regression model returns an output value of "True" as to whether the electronic communication is acceptable, then the electronic communication may be determined to be acceptable with approximately 90% certainty. As the first logistic regression model continues to be trained on more labeled data 310, the threshold may be adjusted.

As another example, threat determination computing platform 110 may determine the second threshold for true positive rates (TPR) to be 90%. Accordingly, the second logistic regression model may be trained to have a TPR at or above 90%. Generally, a high threshold may be set to ensure that the electronic communication is determined to be spam with a high degree of certainty. In some embodiments, the machine learning model may determine, at step 325A, whether a second true positive rate (TPR2) associated with the second logistic regression model exceeds the second threshold. Upon a determination that TPR2 exceeds the second threshold, the machine learning model may classify the electronic communication as highly likely to be spam, and may proceed to trigger an appropriate response at step 345. For example, when the electronic communication is input into the second logistic regression model, and the second logistic regression model returns an output value of "True" as to whether the electronic communication is spam, then the electronic communication may be determined to be spam with approximately 90% certainty. As the second logistic regression model continues to be trained on more labeled data 310, the threshold may be adjusted.

Also, for example, threat determination computing platform 110 may determine the third threshold for true positive rates (TPR) to be 90%. Accordingly, the third logistic regression model may be trained to have a TPR at or above 90%. Generally, a high threshold may be set to ensure that the electronic communication is determined to be a test communication with a high degree of certainty. In some embodiments, the machine learning model may determine, at step 330A, whether a third true positive rate (TPR3) associated with the third logistic regression model exceeds the third threshold. Upon a determination that TPR3 exceeds the third threshold, the machine learning model may classify the electronic communication as highly likely to be a test communication, and may proceed to trigger an appropriate response at step 345. For example, when the electronic communication is input into the third logistic regression model, and the third logistic regression model returns an output value of "True" as to whether the electronic communication is a test communication, then the electronic communication may be determined to be a test communication with approximately 90% certainty. As the third logistic regression model continues to be trained on more labeled data 310, the threshold may be adjusted.

As another example, threat determination computing platform 110 may determine the fourth threshold for true positive rates (TPR) to be 30%. Accordingly, the fourth logistic regression model may be trained to have a TPR at or above 30%. Generally, a low threshold may be set to ensure that the electronic communication is determined to be malicious with a low degree of certainty, so as not to eliminate potentially malicious communications. In some embodiments, the machine learning model may determine, at step 335A, whether a fourth true positive rate (TPR4) associated with the fourth logistic regression model exceeds the fourth threshold. Upon a determination that TPR4 exceeds the fourth threshold, the machine learning model may classify the electronic communication as highly likely to be malicious, and may proceed to trigger an appropriate response at step 345. For example, when the electronic communication is input into the fourth logistic regression model, and the fourth logistic regression model returns an output value of "True" as to whether the electronic communication is malicious, then the electronic communication may be determined to be malicious with approximately 30% certainty. This generally ensures that a majority of communications that may be likely (with low likelihood) to be malicious, may be identified as malicious. As the fourth logistic regression model continues to be trained on more labeled data 310, the threshold may be adjusted. For example, the threshold may be increased based on a greater certainty of identifying malicious communications.

In some embodiments, threat determination computing platform 110 may aggregate an output of, the first regression model, the second logistic regression model, the third logistic regression model, and the fourth logistic regression model, to determine whether the potentially unacceptable electronic communication is unacceptable. For example, when an electronic communication is determined to be malicious by the fourth logistic regression model, then regardless of an outcome of the other logistic regression models, the electronic communication may be labeled as malicious. Also, for example, the first logistic regression model may be associated with a TPR of 95%, and the fourth logistic regression model may be associated with a TPR of 90%. Accordingly, when an output value for the electronic communication from the first logistic regression model is True (indicating that the electronic communication is acceptable with a very high likelihood), and an output value for the electronic communication from the fourth logistic regression model is False (indicating that the electronic communication is not malicious with a very high likelihood), then the electronic communication may be classified as acceptable.

As another example, the first logistic regression model may be associated with a TPR of 75%, and the fourth logistic regression model may be associated with a TPR of 40%. Accordingly, when an output value for the electronic communication from the first logistic regression model is True (indicating that the electronic communication is acceptable with a medium likelihood), and an output value for the electronic communication from the fourth logistic regression model is True (indicating that the electronic communication is malicious with a low likelihood), then the electronic communication may be classified as malicious.

Also, for example, the first logistic regression model may be associated with a TPR of 99%, and the fourth logistic regression model may be associated with a TPR of 10%. Accordingly, when an output value for the electronic communication from the first logistic regression model is True (indicating that the electronic communication is acceptable with a very high likelihood), and an output value for the electronic communication from the fourth logistic regression model is True (indicating that the electronic communication is malicious with a very low likelihood), then the electronic communication may be classified as acceptable.

In some embodiments, threat determination computing platform 110 may train the machine learning model based on previously detected anomalous patterns. For example, threat determination computing platform 110 may train a machine learning model to recognize anomalous patterns that were previously detected. In some embodiments, additional detection rules may be input into threat determination computing platform 110. For example, in some embodiments, threat determination computing platform 110 may, at step 350, perform supervised learning by generating, based on an output of one or more regression models, labeled data to train the machine learning model. For example, an output of the regression models may be utilized to generate labeled data that may be used to train the machine learning models. For example, the one or more attributes of the electronic communication may be associated with a determination whether the electronic communication is determined to be a spam, malicious, a test communication, or acceptable. Accordingly, the machine language model may learn over time to make better predictions.

Returning now to FIG. 2, at step 260, threat determination computing platform 110 may determine whether the electronic communication is malicious, spam, or a test communication. Upon a determination that the electronic communication is malicious, spam, or a test communication, the process may move to step 235. Upon a determination that the electronic communication is not malicious, spam, or a test communication, the process may move to step 240 and classify the electronic communication as an acceptable communication.

In some embodiments, the machine learning model may be unable to determine whether the electronic communication is acceptable, malicious, spam, or a test communication. Accordingly, threat determination computing platform 110 may send the electronic communication for analysis by a subject matter expert. In some embodiments, the subject matter expert may be a computing device that may perform further analysis of the electronic communication. In some embodiments, at step 265, as described herein, threat determination computing platform 110 may perform supervised learning to identify malicious communications. For example, threat determination computing platform 110 may determine if the source of the electronic communication is an authorized vendor, if the electronic communication corresponds to a phishing attempts, and so forth.

In some examples, the training may be unsupervised. For example, the machine learning model may utilize an output of text processing of the electronic communication to learn to detect anomalous patterns. For example, identifying an anomalous pattern based on a context of the content may be a form of unsupervised learning. For example, cluster analysis may be utilized to group historical textual data, identify shared attributes, and create rules for pattern recognition based on such rules. One or more neural network models may be utilized to train the machine learning model.

Unsupervised learning may be utilized, for example, to detect unknown patterns. For example, the machine learning model may analyze large volumes of data based on the one or more attributes. Based on such analysis, the machine learning model may detect hidden patterns in the information. Also, for example, as more data is intercepted via the networks (e.g., unlabeled data), the machine learning model may continually learn to detect additional patterns. Many available techniques for unsupervised learning may be utilized, such as, for example, clustering, partitioning, agglomerative, clustering of data based on fuzzy sets, probabilistic clustering, and so forth. Also, for example, clustering techniques may include, for example, hierarchical clustering, K-means clustering, singular value decomposition, principal component analysis ("PCA"), and so forth.

In some embodiments, threat determination computing platform 110 may train a machine learning model based on supervised learning methods. For example, labeled data may be provided to the machine learning model. For example, one or more rules may be provided to the machine learning model. Also, for example, when threat determination computing platform 110 detects an anomalous pattern, this may be verified as anomalous or not by a domain or subject matter expert, and such labeled data may be provided to the machine learning model.

Given the large volumes of data generated over the networks, much of the training data may not be labeled. Accordingly, threat determination computing platform 110 may also train the machine learning model based on semi-supervised learning methods. For example, some of the textual data in the electronic communication may be identified as anomalous patterns by domain experts, and may be provided to the machine learning model as labeled data.

Generally, if threat determination computing platform 110 fails to detect an anomalous pattern, the transmission of the textual data may be allowed to proceed. For example, if threat determination computing platform 110 analyzes an electronic communication and fails to detect an anomalous pattern, the electronic communication may be allowed to be transmitted to an intended recipient. As another example, if threat determination computing platform 110 analyzes a document spooled to be printed and fails to detect an anomalous pattern, the document may be allowed to proceed to be spooled to the print device.

Figure 4:
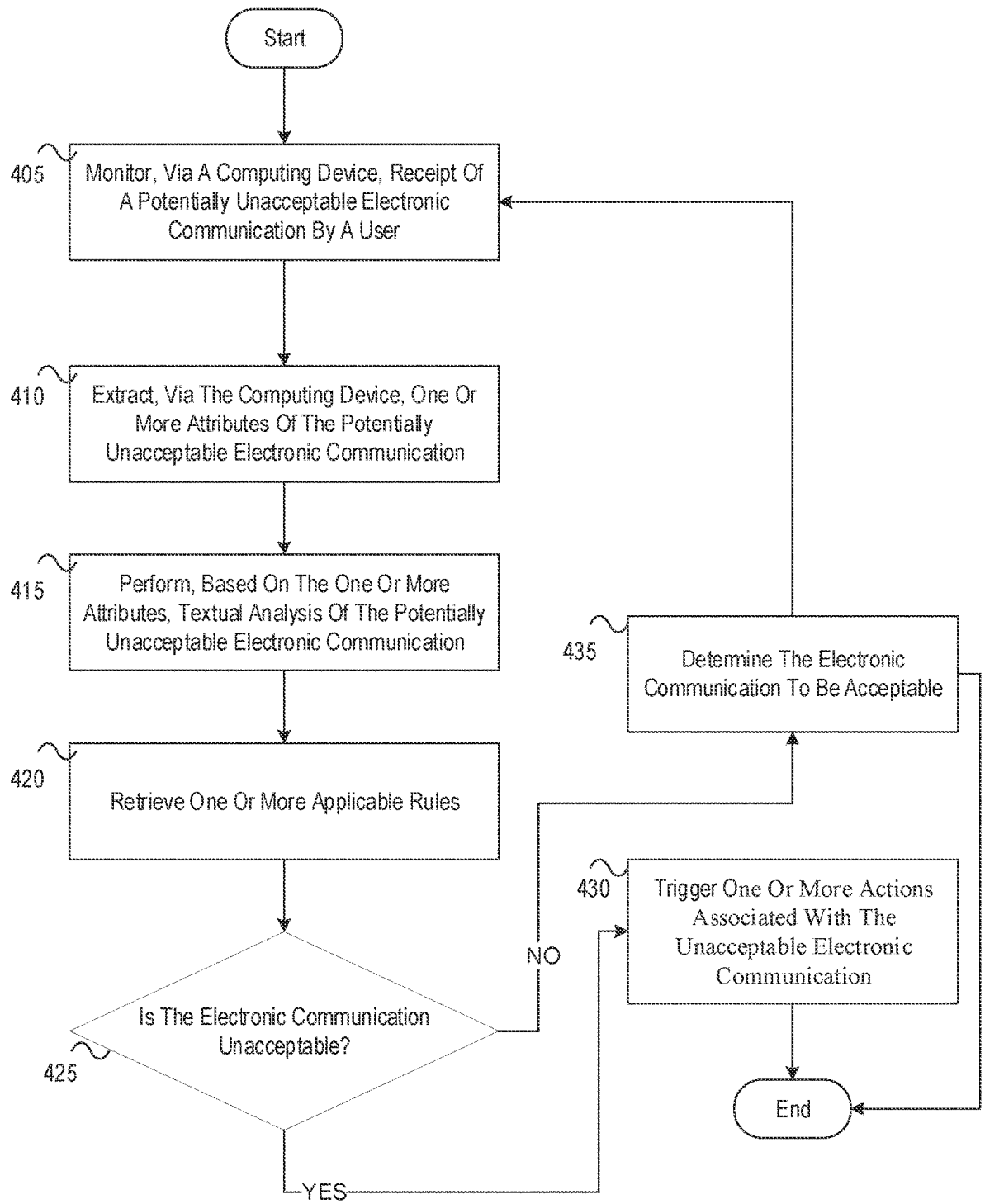
FIG. 4 depicts another illustrative method for machine learning based analysis of electronic communications in accordance with one or more example embodiments.

FIG. 4 depicts an illustrative method for machine learning based analysis of electronic communications in accordance with one or more example embodiments. Referring to FIG. 4, at step 405, threat determination computing platform 110 having at least one processor, a communication interface, and memory may monitor, via a computing device, receipt of a potentially unacceptable electronic communication by a user. At step 410, threat determination computing platform 110 may extract, via the computing device, one or more attributes of the potentially unacceptable electronic communication. At step 415, threat determination computing platform 110 may perform, via the computing device and based on the one or more attributes, textual analysis of the potentially unacceptable electronic communication. At step 420, threat determination computing platform 110 may retrieve one or more rules applicable to the potentially unacceptable electronic communication.

At step 425, threat determination computing platform 110 may determine, based on the textual analysis and the one or more rules, and based on a repository of previously identified unacceptable content, whether the potentially unacceptable electronic communication is unacceptable. If at step 425, threat determination computing platform 110 determines that the potentially unacceptable electronic communication is unacceptable, the process moves to step 430. At step 430, threat determination computing platform 110 may trigger, based on a determination that the potentially unacceptable electronic communication is unacceptable, one or more actions associated with the unacceptable electronic communication. If at step 425, threat determination computing platform 110 determines that the potentially unacceptable electronic communication is authorized, the process may proceed to step 435. At step 435, threat determination computing platform 110 may label the electronic communication as an acceptable communication. Also, at step 435, in some embodiments, the process may return to step 405 to continue monitoring electronic communications for unacceptable content.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure more effectively, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
extract one or more attributes of a potentially unacceptable electronic communication, the one or more attributes of the potentially unacceptable electronic communication including at least network information associated with transmission of the potentially unacceptable electronic communication and a list of computer network nodes that routed the potentially unacceptable electronic communication;
perform, based on the one or more attributes, textual analysis of the potentially unacceptable electronic communication;
retrieve one or more rules applicable to the potentially unacceptable electronic communication, the one or more rules including at least one rule based on a string generated from the one or more attributes of the potentially unacceptable electronic communication, wherein the at least one rule based on the string generated from the one or more attributes of the potentially unacceptable electronic communication includes classifying the potentially unacceptable electronic communication based on the string and wherein the string is a case-sensitive string;
determine, based on the textual analysis and the one or more rules, and based on a repository of previously identified unacceptable content, whether the potentially unacceptable electronic communication is unacceptable; and
trigger, based on a determination that the potentially unacceptable electronic communication is unacceptable, one or more actions associated with the unacceptable electronic communication.

2. The computing platform of claim 1, wherein the instructions comprise additional computer-readable instructions that, when executed by the at least one processor, cause the computing platform to:
train a machine learning model to determine whether the potentially unacceptable electronic communication is unacceptable.

3. The computing platform of claim 2, wherein the machine learning model comprises:
a first logistic regression model to determine whether the potentially unacceptable electronic communication is authorized;
a second logistic regression model to determine whether the potentially unacceptable electronic communication is spam;
a third logistic regression model to determine whether the potentially unacceptable electronic communication is a test communication; and
a fourth logistic regression model to determine whether the potentially unacceptable electronic communication is malicious.

4. The computing platform of claim 3, wherein the machine learning model comprises, for each logistic regression model, a cost function, and wherein the instructions comprise additional computer-readable instructions that, when executed by the at least one processor, cause the computing platform to:
optimize the cost function.

5. The computing platform of claim 4, wherein the instructions comprise additional computer-readable instructions that, when executed by the at least one processor, cause the computing platform to:
dynamically adjust, for each logistic regression model, a threshold associated with the cost function, wherein a threshold associated with the fourth logistic regression model is lower than a threshold associated with the first logistic regression model, the second logistic regression model and the third logistic regression model.

6. The computing platform of claim 3, wherein the instructions comprise additional computer-readable instructions that, when executed by the at least one processor, cause the computing platform to:
aggregate an output of, the first logistic regression model, the second logistic regression model, the third logistic regression model, and the fourth logistic regression model, to determine whether the potentially unacceptable electronic communication is unacceptable.

7. The computing platform of claim 2, wherein the instructions comprise additional computer-readable instructions that, when executed by the at least one processor, cause the computing platform to:
generate, based on an output of one or more regression models, labeled data to train the machine learning model.

8. The computing platform of claim 1, wherein the instructions comprise additional computer-readable instructions that, when executed by the at least one processor, cause the computing platform to:
retrieve, from an electronic mailbox of a user, the potentially unacceptable electronic communication received by the user; and
extract the one or more attributes based on the retrieved potentially unacceptable electronic communication.

9. The computing platform of claim 1, wherein the instructions comprise additional computer-readable instructions that, when executed by the at least one processor, cause the computing platform to:
perform the textual analysis based on natural language processing.

10. The computing platform of claim 1, wherein the one or more attributes further comprise a subject, a header, a sender, a recipient, a body, a mail server, and a message identifier.

11. A method, comprising:
at a computing platform comprising at least one processor, a communication interface, and memory:
extracting one or more attributes of a potentially unacceptable electronic communication, the one or more attributes of the potentially unacceptable electronic communication including at least network information associated with transmission of the potentially unacceptable electronic communication and a list of computer network nodes that routed the potentially unacceptable electronic communication;
performing, based on the one or more attributes, textual analysis of the potentially unacceptable electronic communication;

retrieving one or more rules applicable to the potentially unacceptable electronic communication, the one or more rules including at least one rule based on a string generated from the one or more attributes of the potentially unacceptable electronic communication, wherein the at least one rule based on the string generated from the one or more attributes of the potentially unacceptable electronic communication includes classifying the potentially unacceptable electronic communication based on the string and wherein the string is a case-sensitive string;

determining, based on the textual analysis and the one or more rules, and based on a repository of previously identified unacceptable content, whether the potentially unacceptable electronic communication is unacceptable; and triggering, based on a determination that the potentially unacceptable electronic communication is unacceptable, one or more actions associated with the unacceptable electronic communication.

12. The method of claim 11, further comprising:
training a machine learning model to determine whether the potentially unacceptable electronic communication is unacceptable.

13. The method of claim 12, further comprising:
applying a first logistic regression model to determine whether the potentially unacceptable electronic communication is authorized;
applying a second logistic regression model to determine whether the potentially unacceptable electronic communication is spam;
applying a third logistic regression model to determine whether the potentially unacceptable electronic communication is a test communication; and
applying a fourth logistic regression model to determine whether the potentially unacceptable electronic communication is malicious.

14. The method of claim 13, wherein the machine learning model comprises, for each logistic regression model, a cost function, and further comprising:
optimizing the cost function.

15. The method of claim 14, further comprising:
dynamically adjusting, for each logistic regression model, a threshold associated with the cost function, wherein a threshold associated with the fourth logistic regression model is lower than a threshold associated with the first logistic regression model, the second logistic regression model and the third logistic regression model.

16. The method of claim 13, further comprising:
aggregating an output of, the first logistic regression model, the second logistic regression model, the third logistic regression model, and the fourth logistic regression model, to determine whether the potentially unacceptable electronic communication is unacceptable.

17. The method of claim 12, further comprising:
generating, based on an output of one or more regression models, labeled data to train the machine learning model.

18. The method of claim 11, further comprising:
retrieving, from an electronic mailbox of a user, the potentially unacceptable electronic communication received by the user; and
extracting the one or more attributes based on the retrieved potentially unacceptable electronic communication.

19. The method of claim 11, wherein the one or more attributes further comprise a subject, a header, a sender, a recipient, a body, a mail server, and a message identifier.

20. One or more non-transitory computer-readable media storing instructions that, when executed by a computing platform comprising at least one processor, a communication interface, and memory, cause the computing platform to:
retrieve, from an electronic mailbox of a user, a potentially unacceptable electronic communication received by the user;
extract one or more attributes of the potentially unacceptable electronic communication, the one or more attributes of the potentially unacceptable electronic communication including at least network information associated with transmission of the potentially unacceptable electronic communication and a list of computer network nodes that routed the potentially unacceptable electronic communication;
perform, based on the one or more attributes, textual analysis of the potentially unacceptable electronic communication;
retrieve one or more rules applicable to the potentially unacceptable electronic communication, the one or more rules including at least one rule based on a string generated from the one or more attributes of the potentially unacceptable electronic communication, wherein the at least one rule based on the string generated from the one or more attributes of the potentially unacceptable electronic communication includes classifying the potentially unacceptable electronic communication based on the string and wherein the string is a case-sensitive string;
determine, based on the textual analysis and the one or more rules, and based on a repository of previously identified unacceptable content, whether the potentially unacceptable electronic communication is unacceptable; and
trigger, based on a determination that the potentially unacceptable electronic communication is unacceptable, one or more actions associated with the unacceptable electronic communication.

* * * * *